United States Patent [19]

Petrzelka et al.

[11] Patent Number: 5,295,744
[45] Date of Patent: Mar. 22, 1994

[54] RESILIENT CENTRAL BEARING FOR A PROPELLER SHAFT

[75] Inventors: Miloslav Petrzelka, Much-Kranüchel; Werner Hoffmann, Siegburg, both of Fed. Rep. of Germany

[73] Assignee: GKN Automotive AG, Siegburg, Fed. Rep. of Germany

[21] Appl. No.: 44,929

[22] Filed: Apr. 8, 1993

Related U.S. Application Data

[63] Continuation of Ser. No. 781,508, Oct. 22, 1991, abandoned.

[30] Foreign Application Priority Data

Oct. 23, 1990 [DE] Fed. Rep. of Germany ....... 4033592

[51] Int. Cl.⁵ ............................................. F16C 27/06
[52] U.S. Cl. ........................................ 384/536; 384/582
[58] Field of Search .............. 384/535, 536, 559, 569, 384/581, 582, 584, 585

[56] References Cited

U.S. PATENT DOCUMENTS

| | | | |
|---|---|---|---|
| 2,114,670 | 4/1938 | Searles | 384/536 |
| 2,244,197 | 6/1941 | Hessler | 384/569 |
| 3,037,573 | 6/1962 | Larsen . | |
| 3,093,427 | 6/1963 | Vasta | 384/536 |
| 3,101,979 | 8/1963 | Mard | 384/536 X |
| 3,140,901 | 7/1964 | Young | 384/536 |
| 3,306,680 | 2/1967 | Bruyere | 384/536 |
| 4,063,066 | 12/1977 | Nagoshi | 384/536 X |
| 4,229,055 | 10/1980 | Olschewski et al. | 384/536 |
| 4,548,518 | 10/1985 | Ravinale et al. | 384/536 X |

FOREIGN PATENT DOCUMENTS

| | | |
|---|---|---|
| 0217794 | 10/1961 | Austria . |
| 1036487 | 8/1958 | Fed. Rep. of Germany ...... 384/535 |
| 7122114 | 6/1971 | Fed. Rep. of Germany . |
| 2834979 | 2/1980 | Fed. Rep. of Germany . |
| 3446518 | 7/1986 | Fed. Rep. of Germany . |
| 3908965 | 9/1990 | Fed. Rep. of Germany . |
| 2442372 | 6/1980 | France . |
| 8805503 | 7/1988 | PCT Int'l Appl. . |
| 525432 | 8/1940 | United Kingdom ................ 384/536 |
| 637888 | 5/1950 | United Kingdom ................ 384/536 |

*Primary Examiner*—Thomas R. Hannon
*Attorney, Agent, or Firm*—Harness, Dickey & Pierce

[57] ABSTRACT

A resilient central bearing such as for a propeller shaft for motor vehicle drives, having a roller bearing held in a housing which is disclosed and claimed. A bracket for being secured to the motor vehicle body holds the bearing. The inner bearing race of the roller bearing is associated with a carrying ring having resilient member for receiving the shaft to be supported.

2 Claims, 2 Drawing Sheets

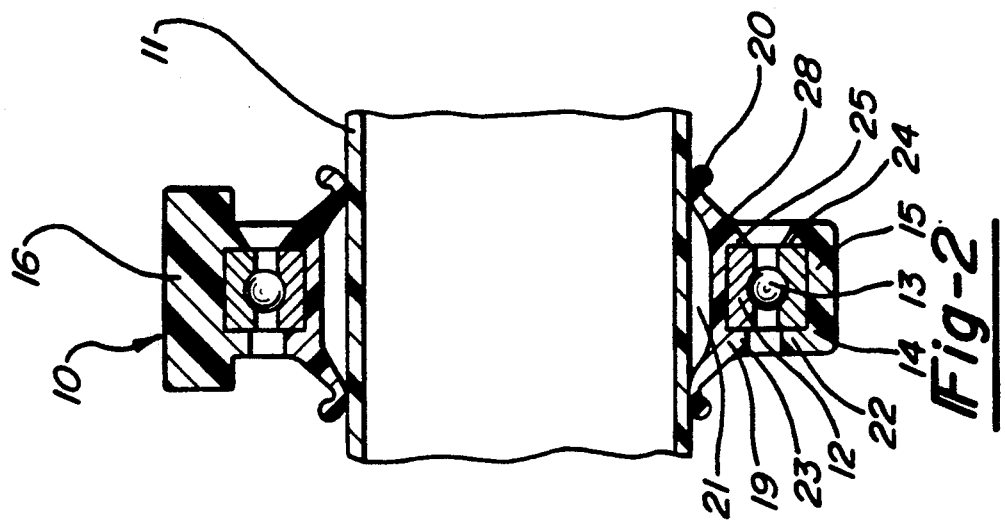
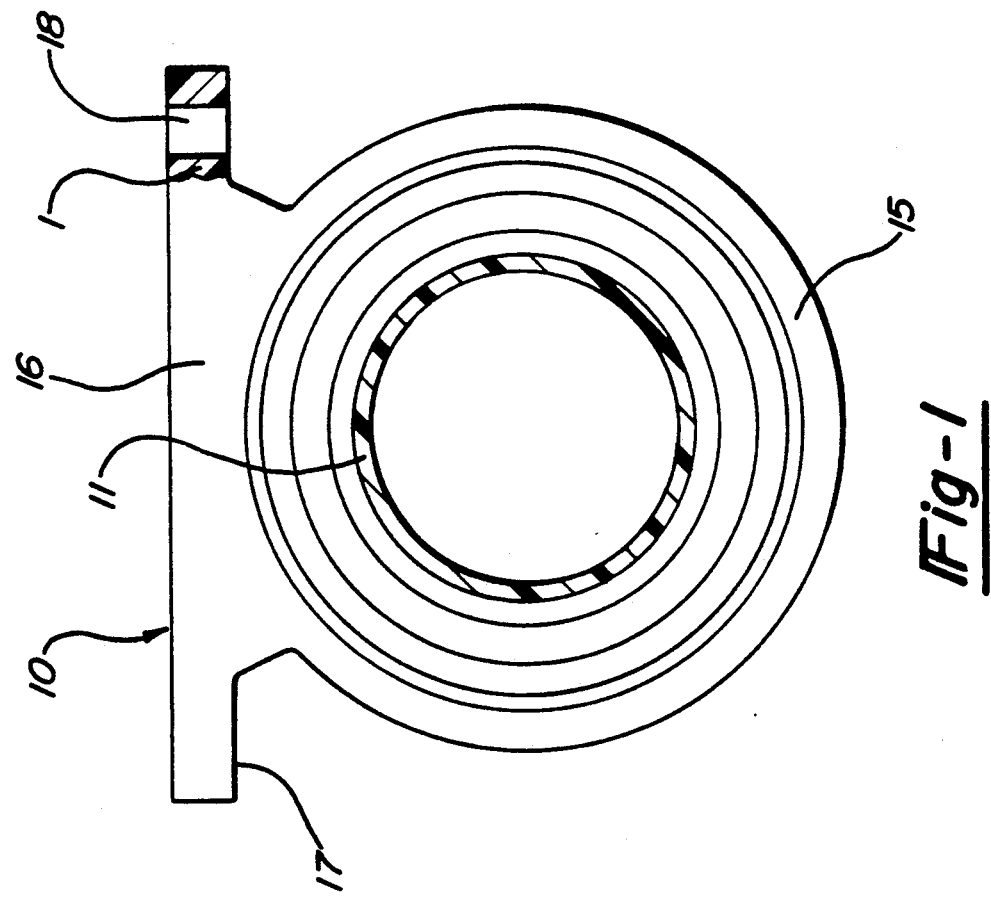

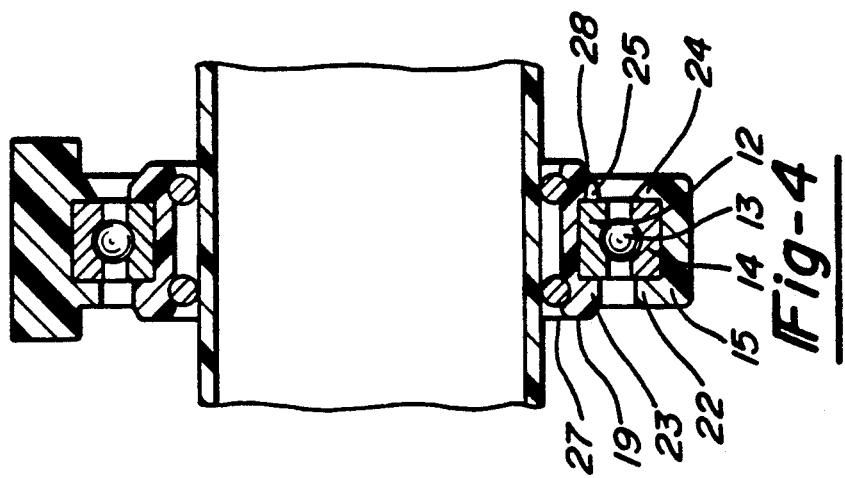
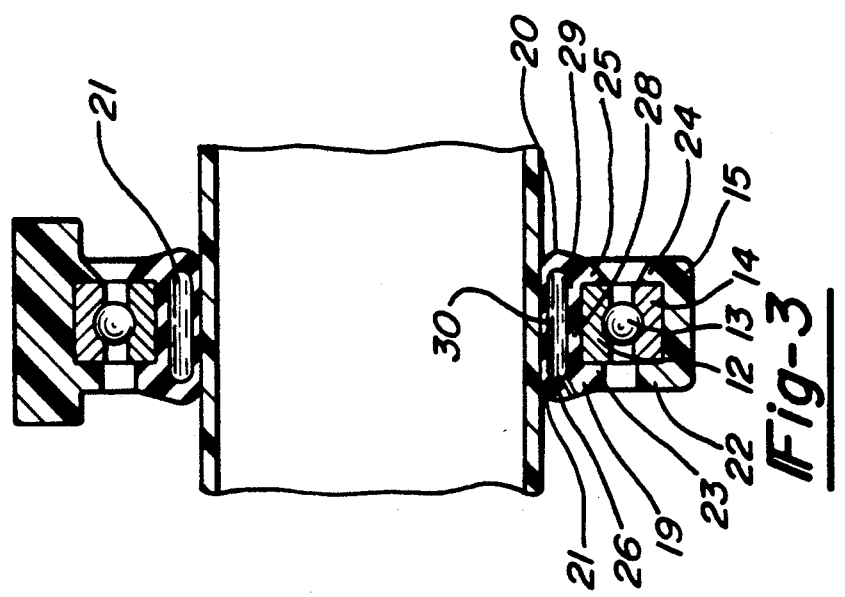

RESILIENT CENTRAL BEARING FOR A PROPELLER SHAFT

This is a continuation of U.S. patent application Ser. No. 781,508, filed Oct. 22, 1991, abandoned.

BACKGROUND OF THE INVENTION

The invention relates to a resilient central bearing for a propeller shaft such as used on motor vehicle drives. The bearing has a roller bearing held in a housing which is provided with a bracket for being secured to the vehicle body.

Because of unbalanced inertia forces and moments of the rotating engine parts, unavoidable rotary vibrations of the engine/gearbox system, and resilient balancing movements of the drive assembly relative to the vehicle the propeller shafts in the driveline of a motor vehicle are subject to permanent loads as a result of rotational and bending vibrations. The vibrations in the resonance range of the driveshaft exhibit particularly high amplitudes, as a result of which the bearing parts and joints are subjected to particularly high loads. Furthermore, the vibrations lead to an interfering noise in the passenger compartment of the vehicle.

Both in the case of divided shafts with an intermediate joint, particularly in the hub of the intermediate joint, and with the increasingly popular undivided shafts made of, for example, a fiber composite material, it is desirable to provide central bearings of the above-mentioned type for reducing the bending vibrations.

It has been a common practice to fit the roller bearing on the shaft so as to be secured axially and radially, with the housing of the bearing being provided with resilient elements, between the outer bearing race and the bracket. The resilient elements are often in the form of an annular boot made of elastomer. Such a housing utilizing hydraulic damping chambers is known from DE 39 31 387.

With previous central bearings, fitting the roller bearing on the tubular shaft has been problematical especially if the latter consists of a fiber composite material which may not be suitable for providing a bearing seat of the conventional type.

SUMMARY OF THE INVENTION

It is an object of the present invention to provide a central bearing with a simple design and which is easy to fit to the shaft and the vehicle. The objective is achieved by the inner bearing race of the roller bearing being associated with a carrying ring with resilient means for receiving the shaft to be supported. By introducing this measure it is possible to provide a propeller shaft bearing where it is not necessary to produce a machined bearing seat and an axial stop on the shaft. Such a propeller shaft bearing is particularly suitable for non-metallic tubular shafts because there is no need for any special surface machining or treatment. By selecting a suitable material for the resilient means, such as plastics, rubber or other elastomers, the necessary degree of damping may be determined and achieved relatively easily.

The necessary degree of damping may also be varied by the geometry of the damping means. In an embodiment the resilient elements are provided in the form of annular lips arranged in pairs and positioned axially outside the annular web, which forms a cavity which carries the inner bearing race. In a further embodiment, resilient elements, in the form of O-rings, are form-fittingly inserted into an annular web which carries the inner bearing race. A further embodiment of the resilient elements consists of an annular member inside an annular web carrying the inner bearing race. The annular member may be in the form of a cavity.

Assembling such a bearing is relatively easy because the resilient elements merely need to be slid onto the tubular shaft. The shaft need not be modified, such as by machining, prior to initially positioning the bearing. After the general position on the shaft has been reached, the bearing is finish-positioned. Any vibrations of the propeller shaft are largely absorbed by the resilient means and not transmitted to the vehicle body.

For securing the bearing to the vehicle body, a securing bracket may be utilized to secure the entire bearing at the housing. The securing bracket and/or the housing may be made of resilient material such as a plastic. Instead of using conventional bolts for securing the bearing to the vehicle it is also possible to provide the vehicle with engaging means which determine the axial position of the housing and bracket and possibly comprise additional vertical securing means.

For holding the roller bearing in the housing and on the carrying ring, the roller bearing should be axially held in the housing between an outer collar associated with the outer bearing race and annular engaging means. At the carrying ring the roller bearing should be axially held between an inner collar associated with the inner bearing race and annular engaging means.

The invention is illustrated in the enclose drawings and described below in greater detail.

BRIEF DESCRIPTION OF THE DRAWINGS

FIG. 1 illustrates an axial view of an embodiment of the invention.

FIG. 2 illustrates a cross-sectional view of an embodiment taken through line A—A of FIG. 1.

FIG. 3 illustrates a cross-sectional view of an alternate embodiment of the invention 1.

FIG. 4 illustrates a cross-sectional view of an alternate embodiment of the invention.

DETAILED DESCRIPTION INCLUDING PREFERRED EMBODIMENT

Turning to FIGS. 1 and 2, the purpose of the intermediate bearing 10 is to dampen and support a diagrammatically illustrated shaft 11 in the bending-critical speed range. The shaft could be a propeller shaft in the driveline of a motor vehicle. The intermediate bearing 10 substantially consists of a conventional roller bearing which, in the embodiment as illustrated, is designed as a deep-groove roller bearing and consists of an inner bearing race 12 and an outer bearing race 14, with the rolling members 13 being arranged therebetween in a conventional manner.

As can be seen in FIGS. 1 and 2, the outer bearing race 14 is associated with a housing 15 which, at one end, changes into a securing bracket 16. The FIG. 1 illustrates further that the bracket 16 is provided with a flange 17 comprising several bores 18. Securing means such as commercial bolts for securing the intermediate bearing 10 to a vehicle body (not illustrated) may be slid through the bores 18. However, it is also possible to provide engaging means between the vehicle body and the intermediate bearing 10.

The inner bearing race 12 is associated with an inner carrying ring 19. The carrying ring 19 comprises an annular web 28 whose inner diameter is not insubstantially greater than the outer diameter of the shaft 11 to be supported. The resulting difference in diameter is bridged by resilient means which, in the case of the embodiment illustrated in FIG. 2, are designed as resilient lips 20. The resilient lips 20 rest under compression on the outer face of the shaft 11 to be supported, forming a continuous cavity 21 relative thereto. By way of the resilient lips 20, the carrying ring 19 is non-rotatingly connected to the shaft 11 which is able to rotate in the roller bearing 13.

For securing the roller bearing, the housing 15 is provided with a radially inwardly pointing collar 22 while one end of the carrying ring 19 is provided with a radially outwardly pointing collar 23. The collars 22 and 23 form the support for the roller bearing to be axially positioned.

At the end axially opposite the collars 22 and 23, the housing 15 comprises resilient engaging means 24 whereas the carrying ring 19 comprises resilient engaging means 25. The dimensions of these resilient conical engaging means 24 and 25 are adapted to the dimensions of the roller bearing 13. The collars 22 and 23 could be replaced by further engaging means thereby permitting assembly from both sides of the roller bearing.

In the case of the embodiment of FIG. 3, a double wall annular member 30 is connected so as to be integral with the annular web 28. The annular member 30 rests on the outer face of the shaft 11 to be supported and forms a cavity 21 which is filled with an elastomer 29. The elastomer material 29 may be introduced through one or more sealable filling channels 26. The elastomer sets after having been introduced and succeeds in resiliently damping the shaft 11 to be supported. Instead of the elastomer it is also possible to introduce a damping fluid which, in sealed chambers, has a damping function. Throttling points (not illustrated in detail) for the fluid can be provided in the cavity to effect damping.

In the case of the embodiment illustrated in FIG. 4, a plurality of O-rings 27 form-fittingly engage the annular web 28. The O-rings are arranged between the annular web 28 of the carrying ring 19 and the shaft 11 to be supported. The resilient nature of the O-rings helps dampen vibration from the shaft.

While the above detailed description describes the preferred embodiment of the present invention, it will be understood that the present invention is susceptible to modification, variation and alteration without deviating from the scope and fair meaning of the subjoined claims.

What is claimed is:

1. A bearing for a motor vehicle drive train comprising:
   means for resiliently receiving a shaft means of the drive train, said resilient receiving means including an elongated cavity for enhancing dampening characteristics, said cavity defined along one side by an annular web, a pair of annular lips at its axial ends and the shaft opposing said web;
   roller bearing means comprised of an inner bearing race, an outer bearing race, and roller bearing means for rotationally bearing against said inner bearing race and said outer bearing race;
   said inner bearing race annularly disposed in abutting circumscribing relationship to said resilient receiving means; and
   means for connecting said roller bearing means to a body structure of said motor vehicle, said connecting means annularly disposed in abutting circumscribing relationship to said outer bearing race.

2. The bearing of claim 1 further comprising:
   collar means for restricting axial movement of said inner bearing race beyond said outer bearing race in at least one axial direction; and
   means for biasing said inner and outer bearing races against said collar means.

* * * * *